Figure 1:
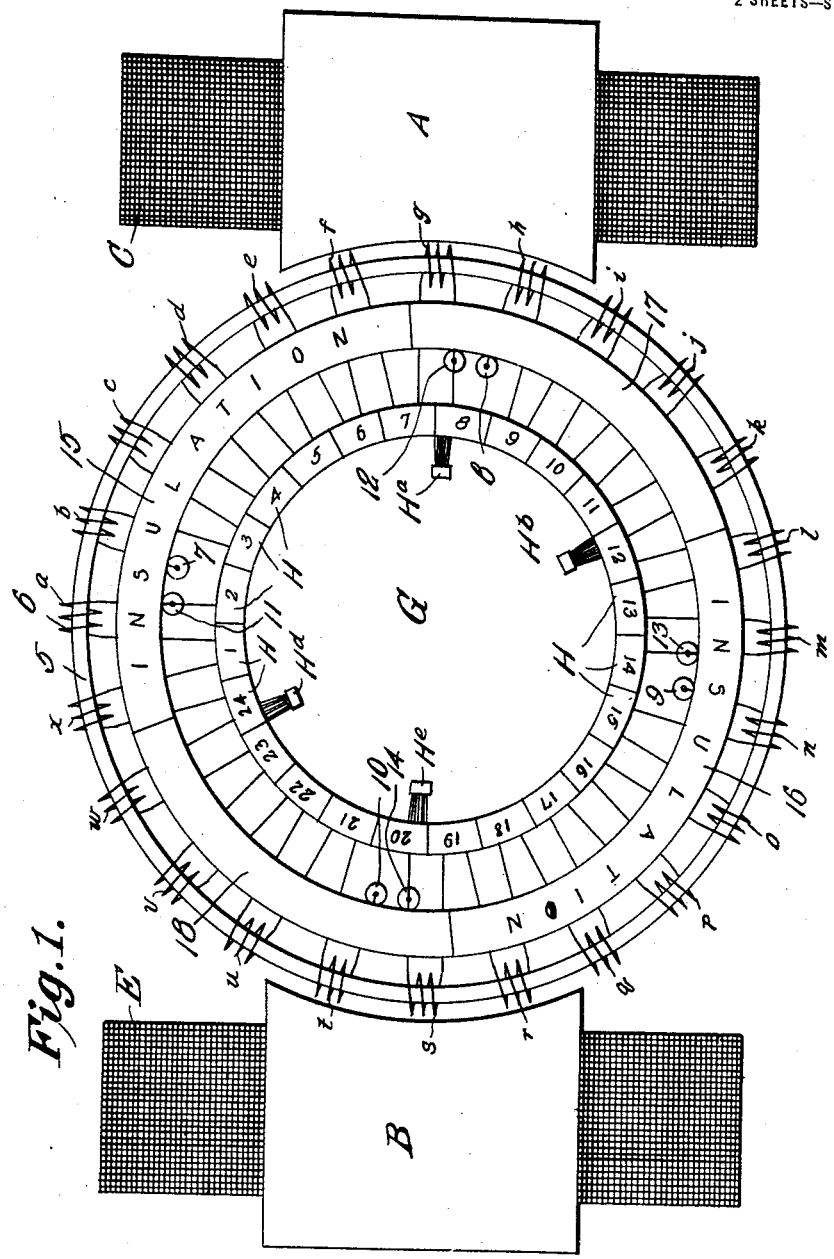

P. H. KUHN.
DYNAMO ELECTRIC MACHINE.
APPLICATION FILED OCT. 16, 1917.

1,402,870.

Patented Jan. 10, 1922.
2 SHEETS—SHEET 1.

WITNESSES
James F. Crown,
H. G. Pierson

INVENTOR
Preston H. Kuhn,
By Richard B. Owen,
ATTORNEY

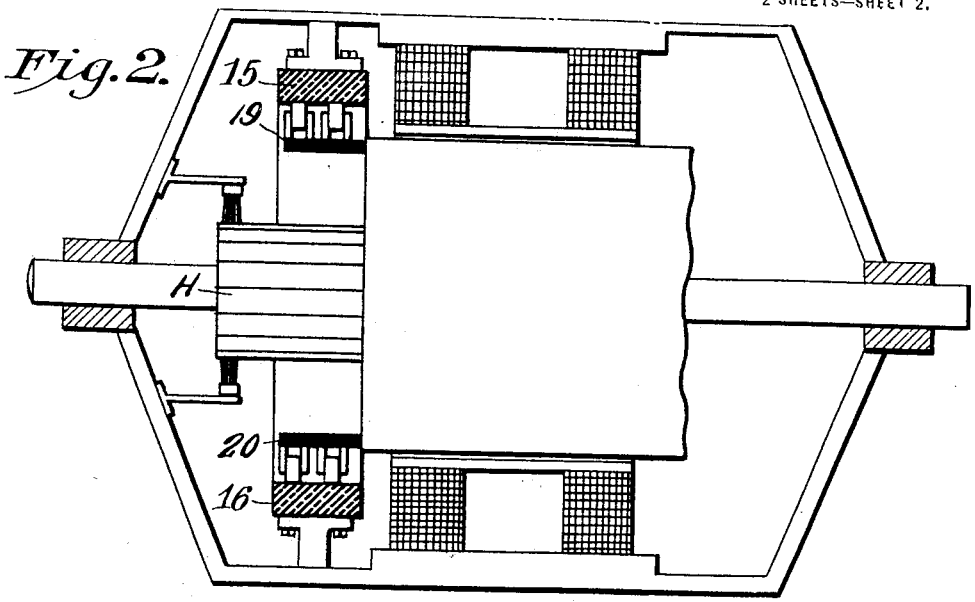
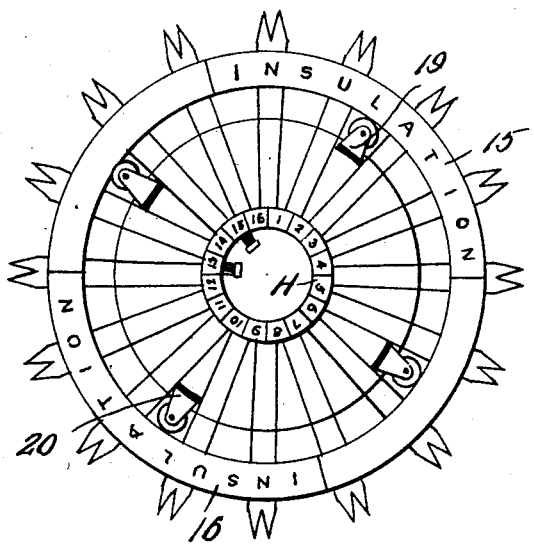

UNITED STATES PATENT OFFICE.

PRESTON HOLMES KUHN, OF EL PASO, TEXAS.

DYNAMO-ELECTRIC MACHINE.

1,402,870. Specification of Letters Patent. Patented Jan. 10, 1922.

Application filed October 16, 1917. Serial No. 196,906.

*To all whom it may concern:*

Be it known that I, PRESTON H. KUHN, a citizen of the United States, residing at El Paso, in the county of El Paso and State of Texas, have invented certain new and useful Improvements in a Dynamo-Electric Machine, of which the following is a specification.

This invention relates to a dynamo-electric machine.

One object is to provide a rotor wherein certain of the coils of the winding thereon are automatically cut out and utilized as open coils to prevent the turns in those coils from having a demagnetizing action.

Another object is to provide a rotor whose core consists of non-magnetic material to reduce the inductance and self-induction of the winding and the sparking at the commutator due to the shifting of the magnetic field and the neutral or point of commutation.

Broadly stated the invention comprises a stator having a winding, a rotor having a non-magnetic core, windings thereon formed into subdivided coils, a commutator and brushes therefor, a contact ring having alternate segments of insulation, and brushes for said ring formed as contact wheels or rollers, and the method for preventing the magnetic drag which consists in connecting certain coil terminals with the contact wheels so that upon rotation the coils may be cut into and cut out of circuit after having passed a predetermined point.

One practical form of construction to carry out the method will be described and illustrated in the accompanying drawings, in which—

Figure 1 is a diagrammatic view showing the relative positions of the several parts, Figure 2 is a part sectional view showing the contact wheels or rollers contacting with the ring which is shown in section through two of the insulating segments, and Figure 3 is another diagrammatic view with two of the commutator brushes in position.

In the preferred method of carrying out the invention there is provided a stator having the pole pieces A and B. Connected with these pole pieces are suitable pole limbs which carry the windings indicated at C and E. The pole pieces A and B should have their projecting surfaces curved in a suitable manner to cooperate with the rotor which is generally indicated at G.

The rotor preferably consists of a non-magnetic core 5. In the showing made in Figure 1 the core may be formed as a ring on which may be mounted the winding 6. The winding as shown is substantially that which is known as the Gramme ring type. The terminals of the majority of the winding 6 are brought down and connected to adjacent bars of the commutator generally indicated at H. The commutator H may be formed in the usual way and the one shown in Figure 1 is formed of 24 bars having suitable insulation therebetween as is usual in such construction.

The winding on the rotor is indicated by the coils $a$ to $x$ inclusive. The coils $b$, $h$, $n$, and $t$ have only one of their terminals connected to a commutator bar and as shown these bars are $H^2$, $H^9$, $H^{15}$, and $H^{21}$. The other terminals of the coils $b$, $h$, $n$, and $t$ are connected to suitable contact wheels or rollers 7, 8, 9, and 10 respectively.

The coils $a$, $g$, $m$, and $s$ each have their several terminals connected to commutator bars. As shown the coil $a$ has its terminals connected to the bars $H^1$, and $H^2$; the coil G has its terminals connected to the bars $H^7$, and $H^8$; the coil $m$ has its terminals connected to the bars $H^{13}$, and $H^{14}$; and the coil $s$ has its terminals connected to the bars $H^{19}$ and $H^{20}$.

The lead which connects the bar $H^2$ with the coil $a$ is also connected with a contact wheel or roller 11; the lead which connects the bar $H^8$ with the coil $g$, is also connected with a contact wheel or roller 12; the lead which connects the bar $H^{14}$ with the coil $m$ is also connected with a contact wheel or roller 13; and the lead which connects the bar $H^{20}$ with the coil $s$ is also connected with a contact wheel or roller 14.

The several contact wheels or rollers are spaced peripherally from each other and also spaced axially from each other as shown in Figure 2. These contact wheels or rollers are preferably placed so that they have the same radius of rotation and thus are adapted to contact with a contact ring.

The contact ring, as shown in Figure 1, is composed of two segments formed of insulating material 15 and 16 and two conducting segments 17 and 18. The ring preferably is provided with an unbroken interior face so that the several contact wheels or rollers may pass from the insulating to the conducting part without chatter and jumping.

The ring may be assembled in any proper or workman-like manner and it may be suported in any usual or customary manner. In the construction shown it is preferred that the ring remains stationary though it may be provided with means for giving a slight arcuate adjustment in order to vary the making and breaking in the contacts for the several circuits.

To provide for the current collection and distribution with respect to the external circuit and the winding in the rotor, the brushes $Ha$, $Hb$, $Hc$, and $Hd$ may be employed. These brushes may be of any usual type of construction such as are commonly employed upon dynamo-electric machines.

As shown in Figure 2 the contact wheels or rollers are spaced from each other and may be carried in suitable holders such as are illustrated at 19 and 20. The construction of these holders may be such that the rollers may revolve freely therein and may be supplied with suitable devices to insure a good contact with the inner surface of the ring. The holders which have been shown are merely conventional to illustrate one way of carrying the wheels or rollers. As disclosed in this Figure 2 it will be seen that they are axially disposed in pairs and they are arranged in groups of two pairs at spaced intervals around the inner surface of the ring. The method of assemblying this ring so that the wheels or rollers contact upon the inner side is merely to describe the diagrammatic views shown in Figures 1 and 3.

An inspection of Figure 1 will reveal the following condition of affairs relating to the circuit connections wherein it is found that the rotor coils $t$, $u$, $v$, and $w$ are active upon one side while upon the other the coils $h$, $i$, $j$, and $k$ are active. The remainder of the coils upon the rotor are inactive. As the rotor moves it will bring the coil $u$ into the position formerly occupied by the coil $t$, while upon the opposite side of the rotor the coil $i$ will move to occupy the space occupied by the coil $h$.

It will be seen by the constant rotation of the rotor that as it revolves the contact wheels will alternately move over segments of insulation and conduction. This will interrupt the continuity of the circuit so that after the coils pass a predetermined point they will be cut out of circuit and will therefore not carry any current. By making these coils automatically put themselves on open circuit they will reduce the drag upon the inductors and conductors passing through the magnetic fields. To move effectually to insulate the contact wheels 7 to 14 from each other the holders 19 and 20 may be provided with suitable insulating portions as shown.

Minor changes in form, proportion and details of construction may be resorted to without departing from the spirit of the invention or the scope of the appended claim.

I claim—

A dynamo-electric machine consisting of a stator, a rotor having a core of non-magnetic material, a winding for the rotor subdivided into coils, a commutator consisting of a circular series of bars, certain of said coils having one end and one end only connected to certain of the bars respectively, the remaining coils each having one end connected to a bar and the other end to the adjacent bar, a fixed contact ring consisting of alternate conducting and insulating segments, brushes travelling over the ring and each connected to the remaining end of a respective first mentioned coil, other brushes travelling over said ring and each connected to a respective coil of the second mentioned coils, the coils to which the last mentioned brushes are connected being respectively adjacent a respective first mentioned coil and the brush connections being to adjacent ends.

In testimony whereof I affix my signature in presence of witnesses.

PRESTON HOLMES KUHN.

Witnesses:
FREDERIC HALL CHESNEY,
D. G. HEINEMAN,
W. W. HARVEY.